Oct. 26, 1926.
A. KÉGRESSE
1,604,697
DRAFT BAR FOR TRACTORS AND TRAILERS
Filed June 9, 1925   2 Sheets-Sheet 2
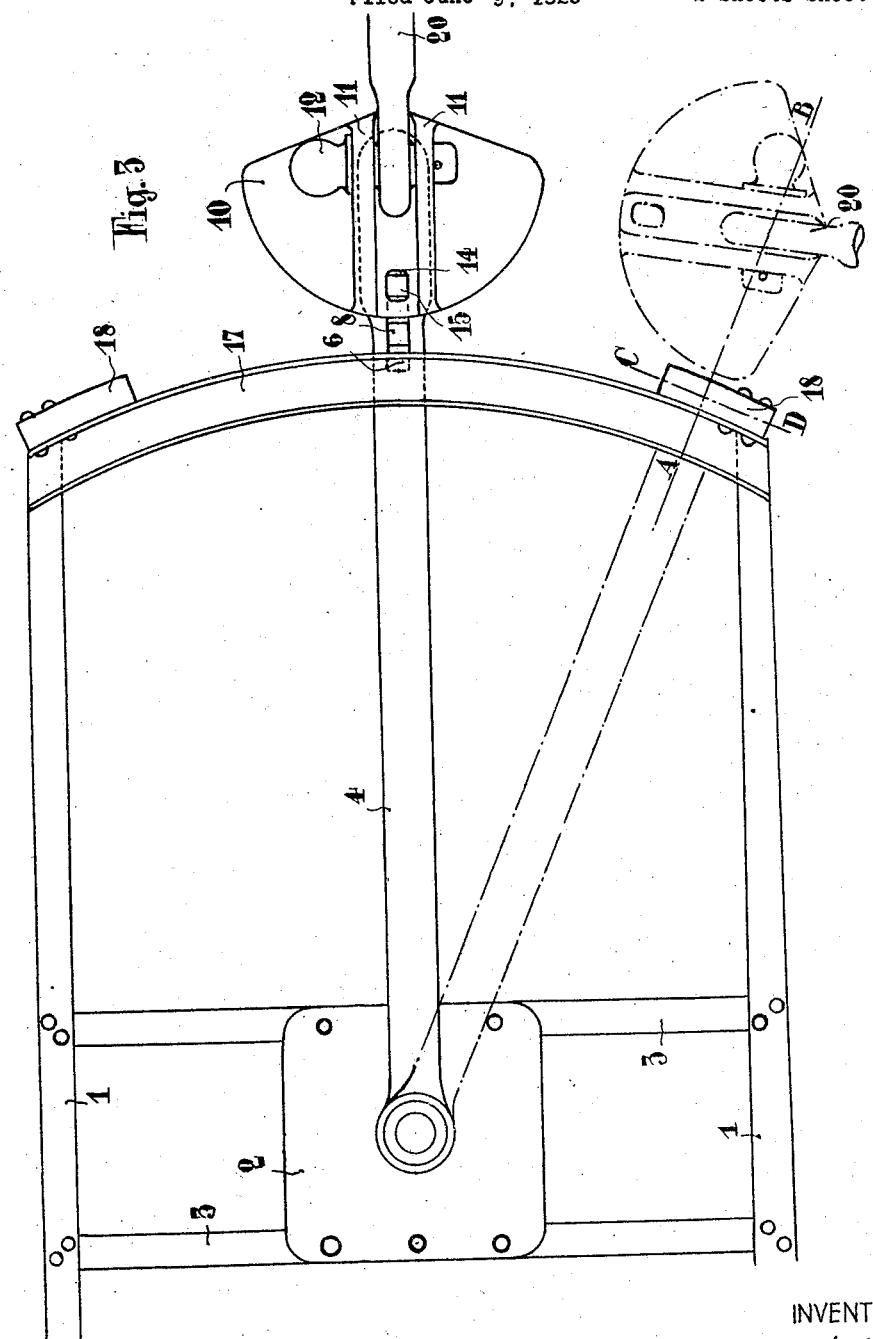
INVENTOR:
Adolphe Kégresse
BY
ATTORNEY Patented Oct. 26, 1926.

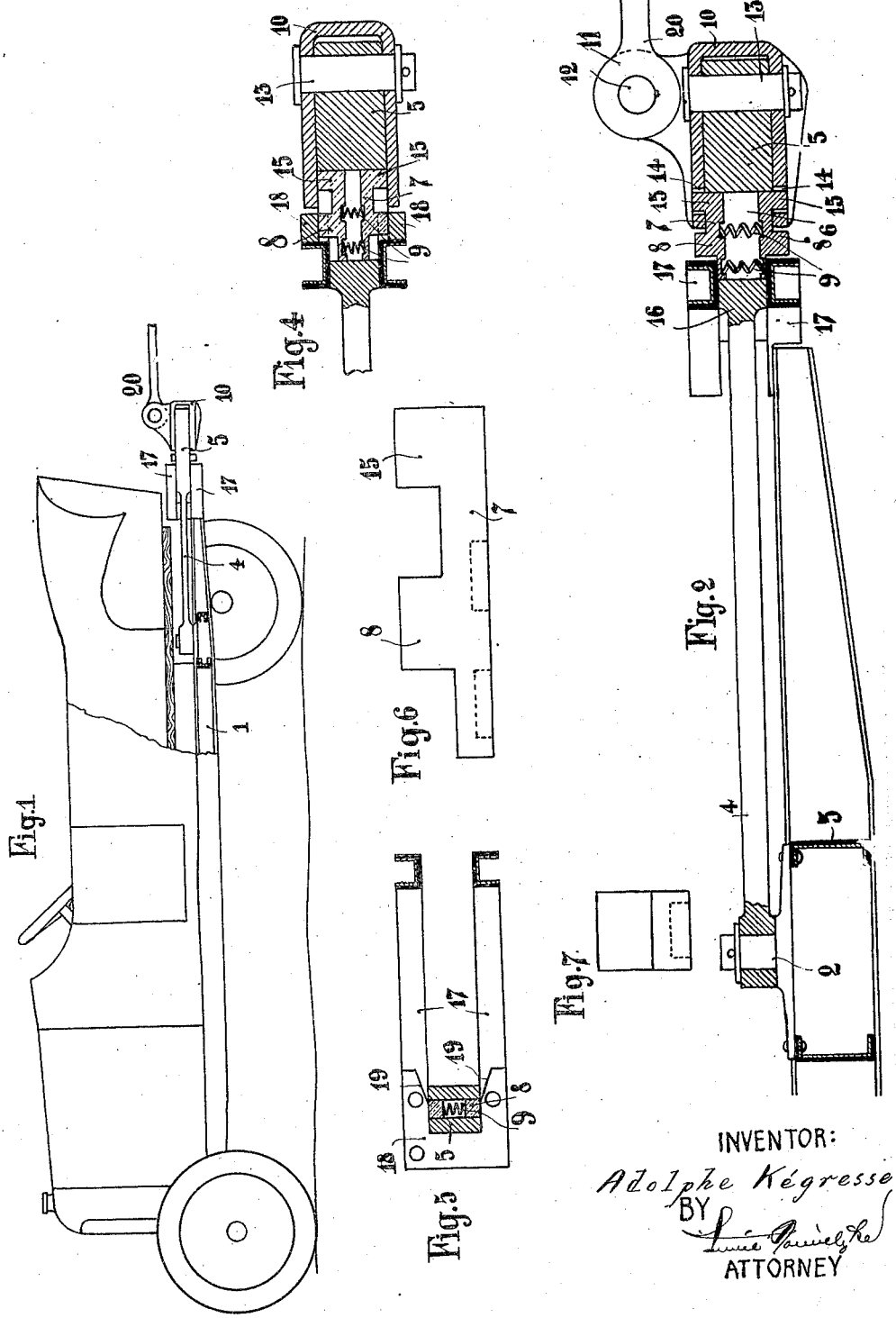

1,604,697

UNITED STATES PATENT OFFICE.

ADOLPHE KÉGRESSE, OF PARIS, FRANCE.

DRAFT BAR FOR TRACTORS AND TRAILERS.

Application filed June 9, 1925, Serial No. 35,987, and in France June 18, 1924.

The devices generally used to couple trailers with automobiles have their hitching point at the rear of the chassis. And yet persons skilled in the art are aware how advantageous it is to arrange said hitching point between the carrying-axles of the towing vehicle, on the axis of said towing vehicle.

Adoption of this arrangement entails, however, among other drawbacks, the inconvenience of completely prohibiting any portion of the vehicle structure in rear of the selected hitching point and in the plane of the draft bar due to the necessity of allowing for sufficient steering angle of the trailer's traction pole.

The object of my invention is to provide a draft bar which, while permitting any sort of body to be mounted on the chassis, will insure the possibility of turning short, that is to say of taking very short radius curves.

In order to make my invention more clearly understood I have illustrated, as an example, the preferred embodiment thereof in and by drawings appended hereto and wherein:

Figure 1 is a side elevation, with parts broken away, of a towing vehicle fitted with my improved draft-bar, Figure 2 is an enlarged, part-sectional side elevation of the draft-bar;

Figure 3 is a plan view of Figure 2;

Figure 4 is a section on line A—B of Figure 3 with elements 11 and 20 omitted;

Figure 5 is a section on line C—D of Figure 3;

Figure 6 shows a bolt in elevation; and

Figure 7 is an end view of the bolt.

In all the figures the same numerals denote the same parts.

In Figures 1, 2 and 3 the numeral 1 denotes the side beams of the chassis of the vehicle. 2 is the pintle of the draft bar secured to the longitudinal bearers of the chassis by means of cross-connections 3.

On pintle 2 is freely mounted the front section 4 of the draft-bar which terminates at the extremity opposite the pintle, in a head 5 (Figures 1, 2 and 4) formed with a vertical and rectangular seat or chamber 6 (Figures 2 and 3) wherein are housed opposed vertically to each other two bolts 7 (Figures 2, 4, 6 and 7), and kept spaced by springs 9 (Figures 2, 4 and 5).

The head 5 of section 4 is straddled by a part 10 forming a cap (Figures 1, 2, 3 and 4) and carrying two ears 11 (Figures 2 and 3) between which vertically engages the eye 20 of the rear section of the draft bar which is adapted to be connected to the trailer (Figures 1, 2 and 3).

The removable pivot pin 12 (Figures 2 and 3) serves as a connection between eye 20 and cap 10. The latter is adjusted on head 5 and adapted to swing or rock thereon by means of a spindle 13 (Figures 2 and 4).

Cap 10 has, in its opposite arms, openings 14 (Figures 2 and 4) into which the rear heads 15 of bolts 7 (Figures 2, 3 and 6) are adapted to engage.

The part 16 of head 5 is adapted to slide between two arcuate beams 17 (Figures 1, 2, 3 and 5) kept suitably spaced and rigidly secured to the longitudinal beams 1 of the chassis, said beams 17 thus replacing the rear cross-piece.

At both ends of beams 17 are fixed stirrups 18 (Figures 3, 4 and 5), the extremities 19 of the arms of which are in the form of inclined planes (Figure 5).

Working of the device is as follows:

On normal road running and when negotiating large radius curves the whole system turns around pintle 2; as seen, however, as the radius of a curve becomes shorter, the front section 4 engages in stirrups 18 (Figures 3, 4 and 5). The front heads 8 of the bolts 7 thereupon come into contact with the inclined ends 19 of the stirrup arms, so that the bolts 7 are forced closer to one another, as shown by Figures 4 and 5.

The effect of such forcing of the bolts towards one another is to disengage their heads 15 from apertures 14 of cap 10; thus rendering the latter free to pivot around spindle 13 on head 5 of section 4.

Cap 10 is thus enabled to be set at any angle required by the steering angle of the vehicle, as indicated by dotted lines in Figure 3.

When the tractor tends to resume a straight direction, cap 10 turns around spindle 13 until the rear section of the draft bar is in alignment with the front section. From this moment, and due to the traction stress, the two sections tend to remain in line.

The tractor continuing to straighten out the angle formed by the front section 4 with the axis of the tractor will go on decreasing, thereby releasing head 5 of said section 4 from stirrup 18. Then, under the influence of springs 9, bolts 7 will move away from each other and their outer heads 15 will again engage in apertures 14 of cap 10 and will lock the latter on head 5 of section 4.

The whole system thereupon becomes rigid and pivots around pintle 2.

Having now particularly ascertained and described the nature of my said invention as well as the manner in which the same is to be performed, I declare that what I claim is:

1. A draft bar for a tractor and trailer, comprising a front section adapted to be pivoted at its forward end to the tractor frame and terminating at its rear end in a head, and a rear section adapted to be connected to the trailer; a cap pivotally mounted on said head and to which the forward end of the rear bar section is pivoted; and locking means carried immediately by said head and normally engaged with said cap to hold the latter against pivotal movement, but automatically released from the cap to permit such movement when the tractor is traveling around a curve of short radius.

2. A draft bar for a tractor and trailer, comprising a front section adapted to be pivoted at its forward end to the tractor frame and terminating at its rear end in a head having a seat therein, and a rear section adapted to be connected to the trailer; an apertured cap pivotally mounted on said head and to which the forward end of the rear bar section is pivoted; and a spring-actuated bolt mounted in the seat in said head and normally engaged in the aperture in said cap to lock the latter against pivotal movement, but automatically disengaged from said aperture to permit such movement when the tractor is traveling around a curve of short radius.

3. A draft bar for a tractor and trailer, comprising a front section adapted to be pivoted at its forward end to the tractor frame and terminating at its rear end in a head, and a rear section adapted to be connected to the trailer; a cap straddling said head and pivoted thereto, and to which the forward end of the rear bar section is pivoted, said cap having apertures in its opposite arms; and locking means carried immediately by said head and normally engaged in said apertures to lock the cap against pivotal movement, but automatically disengaged from said apertures to permit such movement when the tractor is traveling around a curve of short radius.

4. A draft bar for a tractor and trailer comprising a front section adapted to be pivoted at its forward end to the tractor frame and terminating at its rear end in a head having a seat therein, and a rear section adapted to be connected to the trailer; a cap straddling said head and pivoted thereto, and to which the forward end of the rear bar section is pivoted, said cap having apertures in its opposite arms; a pair of oppositely-disposed bolts mounted in the seat in said head and adapted for removable engagement in said apertures to lock the cap against pivotal movement; and spring means interposed between the two bolts to normally maintain such engagement, said bolts being automatically disengaged to permit the pivotal movement of the cap when the tractor is traveling around a curve of short radius.

5. The combination, with a tractor frame embodying a pair of side beams, and a pair of superposed, arcuate cross-beams connecting the rear ends thereof; of a draft bar for connecting a trailer to the tractor, comprising a front section pivoted at its forward end to the tractor frame and terminating at its rear end in a head adapted to travel between the cross-beams, and a rear section adapted to be connected to the trailer, a cap pivotally mounted on said head and to which the forward end of the rear bar section is pivoted, and spring-controlled locking means carried immediately by the head and normally engaged with the cap to lock the latter against pivotal movement; and means arranged at opposite ends of said cross-beams to automatically engage said locking means and release the same from the cap when the tractor is traveling around a curve of short radius.

6. The combination, with a tractor frame embodying a pair of side beams, and a pair of superposed, arcuate cross-beams connecting the rear ends thereof; of a draft bar for connecting a trailer to the tractor, comprising a front section pivoted at its forward end to the tractor frame and terminating at its rear end in a head adapted to travel between the cross-beams, and a rear section adapted to be connected to the trailer, a cap straddling said head and pivoted thereto, and to which the forward end of the rear bar section is pivoted, said cap having apertures in its opposite arms, and a pair of oppositely-acting, spring controlled bolts carried by said head and normally engaged in the apertures in said cap to lock the latter against pivotal movement; and a pair of stirrups secured to opposite ends of said cross-beams to automatically engage said bolts and release them from said apertures when the tractor is traveling around a curve of short radius.

In testimony whereof I affix my signature.

ADOLPHE KÉGRESSE.